Figure 1:
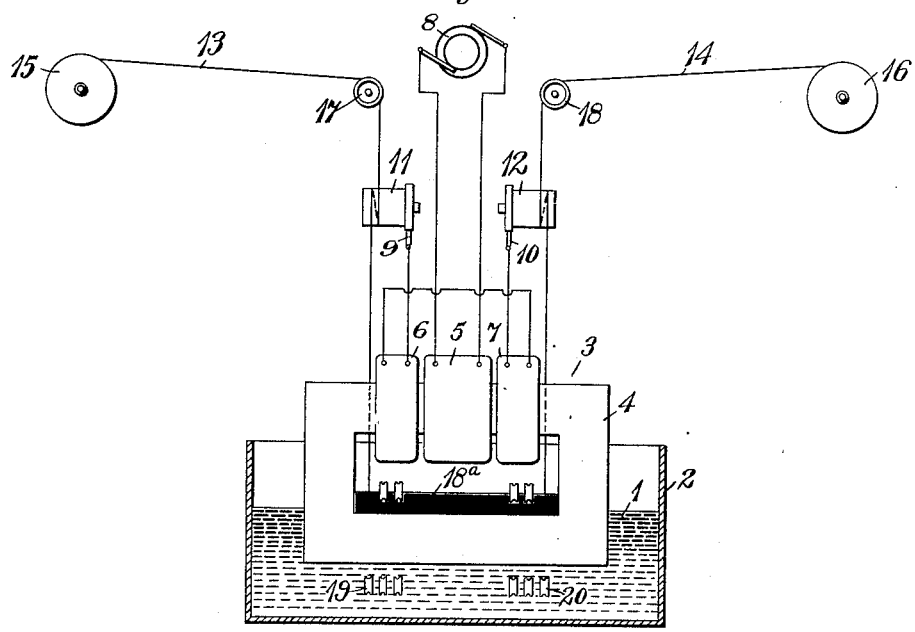

L. W. CHUBB.
METHOD OF AND APPARATUS FOR COATING WIRES AND CABLES.
APPLICATION FILED JUNE 25, 1907. RENEWED NOV. 17, 1911.

1,068,413.

Patented July 29, 1913.

2 SHEETS—SHEET 1.

WITNESSES:
Fred H. Miller
R. J. Dearborn

INVENTOR
Lewis W. Chubb
BY
Wesley G. Carr
ATTORNEY

L. W. CHUBB.
METHOD OF AND APPARATUS FOR COATING WIRES AND CABLES.
APPLICATION FILED JUNE 25, 1907. RENEWED NOV. 17, 1911.

1,068,413.

Patented July 29, 1913.

2 SHEETS—SHEET 2.

WITNESSES:
Fred H. Miller
R. J. Dearborn

INVENTOR
Lewis W. Chubb
BY
Wiley G. Carr
ATTORNEY

UNITED STATES PATENT OFFICE.

LEWIS W. CHUBB, OF WILKINSBURG, PENNSYLVANIA, ASSIGNOR TO WESTINGHOUSE ELECTRIC & MANUFACTURING COMPANY, A CORPORATION OF PENNSYLVANIA.

METHOD OF AND APPARATUS FOR COATING WIRES AND CABLES.

1,068,413.     Specification of Letters Patent.     Patented July 29, 1913.

Application filed June 25, 1907, Serial No. 380,709. Renewed November 17, 1911. Serial No. 660,910.

*To all whom it may concern:*

Be it known that I, LEWIS W. CHUBB, a citizen of the United States, and a resident of Wilkinsburg, in the county of Allegheny and State of Pennsylvania, have invented a new and useful Improvement in Methods of and Apparatus for Coating Wires and Cables, of which the following is a specification.

My invention relates to methods of and apparatus for coating wires and other electrical conductors, and it has for its object to provide an effective method and apparatus whereby a very thin insulating coating may be readily and continuously applied to wires which are to be used in the construction of coils for electrical apparatus.

In the manufacture of small motors and other electrical apparatus, large quantities of small gage wire having cotton or silk insulating coverings have heretofore been employed. In order to materially lessen the expense of insulating such conductors and also to provide an insulating covering that shall occupy less space, I have devised the method and apparatus herein set forth.

It is a well known fact that an electrolytic valve action may be produced in a cell comprising plates of aluminum, copper, cobalt and a few other metals when immersed in a suitable liquid, such as a solution of ammonium borate or a solution of borax, and, furthermore, it has been found by repeated tests that the plate which acts as a valve will readily permit the flow of an electric current at a voltage only slightly above a predetermined amount while it will act as a substantially perfect barrier to currents at a less voltage. This predetermined voltage is dependent upon the material of which a plate is constructed and the solution in which the film is electrolytically produced. While certain metals, when treated in the same way, are capable of resisting only relatively low voltages, aluminum, under the same conditions, will become coated with an insulating film capable of resisting relatively high voltages.

By utilizing the principle of the electrolytic valve, I provide, according to my present invention, a method and an apparatus involving the use of alternating current electrical energy for continuously producing very thin insulating films on the surfaces of aluminum wires and other conductors, which are capable of successfully resisting such electromotive forces as exist between the adjacent turns of field magnet coils for dynamo-electric machines and other windings.

Figure 2:
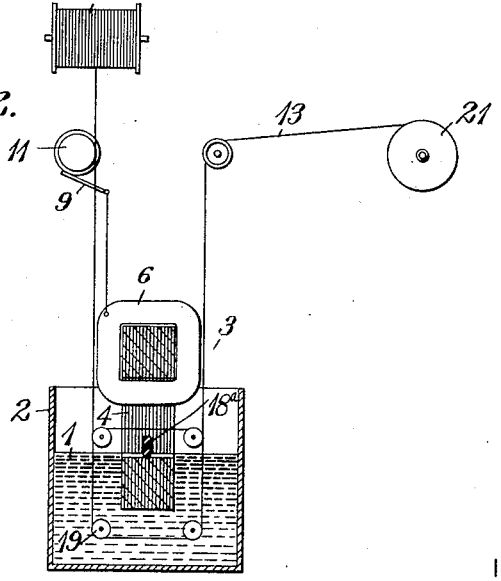
Figure 3:
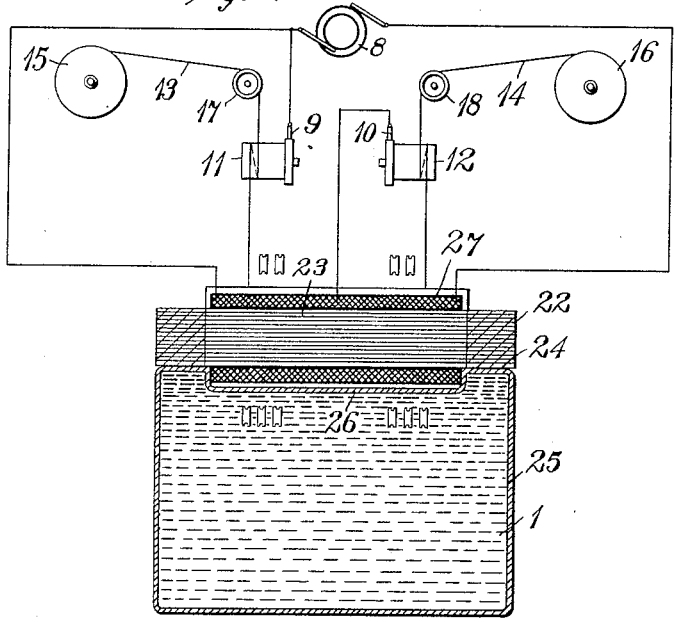
Figure 4:
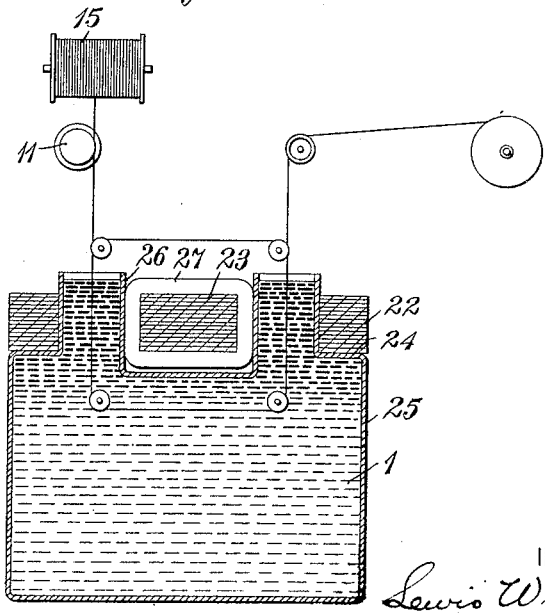

Figure 1, of the accompanying drawings, is a view, partially in side elevation, partially in section and partially diagrammatic, of an apparatus embodying my invention, Fig. 2 is a view similar to Fig. 1 but at right-angles thereto, and Figs. 3 and 4 are views corresponding to Figs. 1 and 2, but illustrating a modified form of apparatus for accomplishing the same results.

Referring to Figs. 1 and 2 of the drawings, a bath 1 of ammonium borate, or other liquid capable of producing an electrolytic valve action in connection with aluminum and other metals, is contained in a suitable tank or vessel 2. An alternating current transformer 3 having a core member 4, a primary winding 5, and secondary windings 6 and 7, is partially immersed in the bath 1, the primary and secondary windings 5, 6, and 7 being preferably located on a portion of the core member 4 which is not immersed in the liquid. The primary winding 5 of the transformer 3 is supplied with energy from a generator 8, or other suitable source, the secondary windings 6 and 7 being interconnected and having their free terminals respectively connected, by brushes 9 and 10, to metal drums or pulleys 11 and 12. Two aluminum wires or cables 13 and 14 are fed from spools or bobbins 15 and 16, over pulleys 17 and 18 and drums 11 and 12, into the bath 1. A non-conducting barrier or partition 18ª may preferably be adapted to prevent the formation of short-circuited transformer secondary paths through the liquid. The conductors are guided around the submerged or partially submerged portion of the core member 4, forming several turns of secondary windings which are respectively connected in series with the windings 6 and 7, two groups of insulating pulleys 19 and 20 acting as guides for the wires as they pass through the bath. The wires are finally passed out of the bath and onto a pair of gathering reels 21.

Referring to Figs. 3 and 4, in which similar parts are designated by the same reference numerals as those of Figs. 1 and 2, a substantially rectangular core member 22, having a cross leg 23, is supported by a shoulder 24 formed on a tank 25 which contains the bath 1. A channel partition 26 serves to keep the liquid away from the leg 23 but does not interfere with the free movement of the conductors 13 and 14 as they pass through the bath and around the transformer leg. The transformer may be provided with primary and secondary windings, as shown in Figs. 1 and 2, or a single winding 27 may be employed, as shown in Figs. 3 and 4. In the latter arrangement, the turns provided by the moving conductors form additions to the main winding of the auto-transformer. Sheet tin or other sheet metal may be used in forming the containing tank 25, since its relation to the core member 22 is such as to avoid wasteful secondary transformer circuits. Since the insulating films that are formed on the surfaces of conductors by the electrolytic action which takes place when they are passed through suitable baths is not injured by the passage of electric current through it into the wire, it is feasible to arrange a system, as above indicated, in which alternating current is employed as a means for producing the electrolytic action.

It has been observed that when an abnormally high voltage is applied to a bare wire before it passes into the bath, considerable heating and sparking take place at the surface of the liquid, and one of the principal advantages in my improved system arises from the fact that a moderate voltage may be impressed upon the wires before they enter the bath, while the additional turns formed by the passage of the wire around the submerged leg of the transformer makes a greater difference of potential between the two conductors before they leave the bath, and, consequently, the electrolytic action is more effective in producing the insulating film upon the surface of the wires. Another advantage in my present system arises from the fact that only a single bath is necessary and, at the same time, two conductors may be continuously supplied with insulating coatings as they are passed therethrough.

It is to be understood that modifications may be effected in the system, without departing from the spirit of my invention, and I desire that only such limitations shall be imposed as are indicated in the appended claims.

I claim as my invention:

1. The combination with a suitable bath, a conducting wire passing therethrough and means for inducing an alternating current in the conductor as it passes through the bath.

2. The combination with a suitable bath, a transformer comprising a core member and primary and secondary windings, of means for passing conductors around the transformer core and through the liquid and establishing an electric circuit through the conductors and the bath.

3. The combination with a suitable bath, a transformer comprising primary and secondary windings and a core member partially submerged in the bath, and a source of alternating current connected to the primary winding, of means for passing conductors through the bath and around the submerged portion of the core and means for establishing a secondary circuit through the conductors and the bath.

4. The combination with a bath of ammonium borate solution or other suitable liquid capable of producing an electrolytic valve action, a transformer comprising primary and secondary windings and a core member partially submerged in the bath, of means for passing conductors around the submerged portion of the transformer core and establishing an electric circuit through the conductors and the bath.

5. The combination with a suitable bath, a transformer comprising primary and secondary windings and a core member which is at least partially submerged in the bath, and a source of alternating current energy connected to the primary winding, of means for so passing a pair of independent conductors through the bath as to produce two groups of turns around the core, and sheaves or pulleys of conducting material severally connected to the conductors before they enter the bath and also connected to the free terminals of the secondary winding.

6. The combination with a bath of ammonium borate, a transformer comprising primary and secondary windings and a core member which is at least partially submerged in the bath, and a source of alternating current energy connected to the primary winding, of means for so passing a pair of independent conductors through the bath as to produce two groups of turns around the transformer core, and sheaves or pulleys of conducting material severally connected to the conductors before they enter the bath and also connected to the free terminal of the secondary winding.

7. In a transformer, the combination with a stationary core member, of a winding therefor comprising a stationary coil and a plurality of convolutions of continuously moving conductors connected in series therewith.

8. In a transformer, the combination with a core member, primary and secondary windings, and a source of alternating current energy connected to the primary winding, of means for passing conductors around the core member in inductive relation therewith.

9. The method of coating a conducting wire with insulation which consists in subjecting successive lengths thereof to the action of a liquid bath and simultaneously passing an alternating electric current therethrough.

10. The method of coating a conducting wire with insulation which consists in moving it continuously through a liquid bath and simultaneously subjecting it to the action of an alternating electric current.

11. The method of coating a conducting wire with insulating material which consists in subjecting successive lengths thereof to the action of a liquid bath and simultaneously subjecting the submerged wire to the action of alternating electric currents both directly and by induction.

12. The method of coating a conducting wire with insulating material which consists in submerging successive lengths thereof in a liquid bath and simultaneously subjecting the submerged wire to the inductive action of an alternating electric current.

13. The method of coating a conducting wire with insulation which consists in effecting movement of the wire through a liquid bath and simultaneously energizing it by alternating current energy.

14. The method of coating an aluminum wire with insulation which consists in effecting movement of the wire continuously through a liquid bath and simultaneously energizing it by alternating current energy.

In testimony whereof I have hereunto subscribed my name this 20th day of June, 1907.

LEWIS W. CHUBB.

Witnesses:
R. D. DE WOLF,
BIRNEY HINES.